United States Patent [19]

Tsinberg

[11] Patent Number: 5,053,860
[45] Date of Patent: Oct. 1, 1991

[54] METHOD AND APPARATUS FOR THE TRANSMISSION AND RECEPTION MULTICARRIER HIGH DEFINITION TELEVISION SIGNAL

[75] Inventor: Mikhail Tsinberg, Riverdale, N.Y.

[73] Assignee: North American Philips Corp., New York, N.Y.

[21] Appl. No.: 428,278

[22] Filed: Oct. 25, 1989

Related U.S. Application Data

[63] Continuation-in-part of Ser. No. 252,954, Oct. 3, 1988.

[51] Int. Cl.$^5$ .............................................. H04N 11/00
[52] U.S. Cl. ......................................... 358/12; 358/15
[58] Field of Search ............................ 358/12, 14, 15

[56] References Cited

U.S. PATENT DOCUMENTS

| | | | |
|---|---|---|---|
| 4,081,827 | 3/1978 | Hipwell | 358/14 |
| 4,473,837 | 9/1984 | Tiemann | 358/12 |
| 4,476,484 | 10/1984 | Haskell | 358/11 |
| 4,535,352 | 8/1985 | Haskell | 358/12 |
| 4,807,030 | 2/1989 | Sacks | 358/141 |

FOREIGN PATENT DOCUMENTS

| | | | |
|---|---|---|---|
| 3414452 | 10/1985 | Fed. Rep. of Germany | 358/12 |
| 1158918 | 7/1969 | United Kingdom | 358/14 |
| 1198986 | 7/1970 | United Kingdom | 358/14 |

*Primary Examiner*—John W. Shepperd
*Attorney, Agent, or Firm*—Michael E. Marion

[57] ABSTRACT

A method and apparatus for generating a multi-carrier high-definition television (HDTV) signal including a digital sound and sync (DSS) component, on a conventional television channel, for example, 6 Hz. MAC derived signal components are quadrature modulated on a plurality of subcarriers and combined in frequency multiplexed form to create an RF signal.

8 Claims, 4 Drawing Sheets

| COMPONENT; 16:9 ASPECT RATIO | ORIGINAL TIME BASE; BANDWIDTH | EXPANSION RATIO | HDS/NA.6 TIME BASE; BANDWIDTH |
|---|---|---|---|
| LD2 | 26 μs ; 3.0 MHz | 27/5 | 140.4 μs ; 0.56 MHz |
| LD4 | 26 μs ; 3.0 MHz | 27/5 | 140.4 μs ; 0.56 MHz |
| Uln | 26 μs ; 2.1 MHz | 27/5 | 140.4 μs ; 0.4 MHz |
| Yln | 26 μs ; 7.3 MHz | 27/5 | 140.4 μs ; 1.35 MHz |
| V3w | 26 μs ; 3.7 MHz | 27/5 | 140.4 μs ; 0.68 MHz |
| Y3w | 26 μs ; 16.8 MHz | 27/5 | 140.4 μs ; 3.1 MHz |
| DIGITAL SOUND | 440 kb/s | | 140.4 μs ; 0.22 MHz |

LD2, LD4: MODULATED IN QUADRATURE ON $fc1 = fh \cdot (2 \cdot n + 1)/2$, $fh = 15{,}734$ KHz Uln, Yln: MODULATED IN QUADRATURE ON $fc2$ V3w, Y3w: MODULATED IN QUADRATURE ON $fc3$ DIGITAL SOUND: MODULATED ON $fc4$

FIG. 4

METHOD AND APPARATUS FOR THE TRANSMISSION AND RECEPTION MULTICARRIER HIGH DEFINITION TELEVISION SIGNAL

This application is a continuation-in-part of U.S. patent application Ser. No. 252,954, filed Oct. 3, 1988.

CROSS REFERENCE TO RELATED APPLICATIONS AND PATENTS

1. U.S. Pat. No. 4,694,338, issued Sept. 15, 1987;
2. U.S. Pat. No. 4,794,447, issued Dec. 27, 1988;
3. U.S patent application Ser. No. 246,490, filed Sept. 19, 1988;
4. U.S. patent application Ser. No. 077,557, filed July 24, 1987;
5. U.S. patent application Ser. No. 252,954, filed Oct. 3, 1988;
6. U.S. patent application Ser. No. 271,136, filed Nov. 14, 1988; and
7. U.S. patent application Ser. No. 353,353, filed May 17, 1989.

The above-referenced patents and applications are all assigned to the same assignee, have common inventorship, and are specifically incorporated by reference herein.

BACKGROUND OF THE INVENTION

The invention comprises a method and apparatus for generating a multi-carrier high definition television (HDTV) signal including a digital sound and sync (DSS) signal. The invention incorporates baseband and RF processing necessary to reduce the bandwidth of an HDTV source signal to that of a conventional television signal, for example 6 MHz at RF. The inventive signal format will be referred to herein as "HDS/NA-6". The baseband HDTV source signal may be 525 lines, 1:1 progressive scanning or 1050 lines, 2:1 interlaced scanning.

Any system for transmitting HDTV will have to initially co-exist with conventional television receivers. Proposed systems to provide such compatibility fall mainly into two categories: "augmentation" systems and "simulcast" systems. Both of these systems seek to take maximum advantage of the existing broadcasting spectrum and at the same time provide both HDTV service for appropriately equipped receivers, and conventional television broadcast service, for example NTSC, for existing television receivers.

U.S. Pat. No. 4,694,338 cited above, as well as pending applications for example, U.S. patent application Ser. Nos. 239,096; 239,091; and 239,148, all filed on Aug. 31, 1988 and owned by the present assignee, relate to methods for providing an HDTV transmission system using the "augmentation" methodology. In such "augmentation" systems, a conventional television signal is transmitted on one conventional television channel. On an adjacent channel, which can be a so-called "taboo" channel, an "augmentation" signal is transmitted which, when combined with the conventional signal in an appropriate receiver, will provide an HDTV display.

The so called "simulcast" systems for providing compatible HDTV service utilize one conventional television channel to transmit a non-compatible HDTV television signal and an adjacent television channel to transmit a conventional television signal which can provide the same programming ("simulcast") as the HDTV signal. Although this method requires the use of two conventional television channels to provide one "compatible" program (HDTV and conventional versions), the degree to which programs are "simulcast" will probably diminish as the number of HDTV receivers increases in proportion to the total number of receivers. The television spectrum therefore can be gradually converted to HDTV signals as conventional television receivers are replaced with HDTV receivers. Although proposals have been made for such "simulcast" systems, for example the Zenith "Spectrum" system and the NHK "MUSE-6" system, up to now, a practical and efficient system for placing a true HDTV signal (one having for example a 16:9 aspect ratio, a horizontal resolution of about 500 TVL/ph and a vertical resolution of about 680 TVL/ph, with minimal motion artifacts) on a conventional broadcast, cable or recording channel did not exist. An object of the instant invention is to provide such a system.

It is another object of the invention to provide a system for transmitting an HDTV signal which can evolve naturally and economically from the existing conventional broadcasting standards.

SUMMARY OF THE INVENTION

As described in U.S. patent application Ser. No. 077,557; filed July 24, 1987 and incorporated by reference herein, multiple television components can be derived from an HDTV source signal and multiplexed in time to form the HDMAC-60 "super line" structure described therein. The line time of the "super line" is 127.11 microseconds which is equal to four sequential HDTV lines or two NTSC interlaced lines. As taught in the '557 application, the components can be for example:

Y1, which is a packet for transmitting a low resolution luminance signal for a first TV line;

Y3, which is a packet for transmitting a high resolution luminance packet for a third TV line;

U1, which is a packet for transmitting the chroma difference of the first TV line;

V3, which is a packet for transmitting the V chroma difference component of the third line;

LD2, which is a packet for transmitting a line difference signal which can be derived for example by the formula $LD = B - (A+C)/2$, where B is a value of a pixel at a particular line and A and C are corresponding pixels vertically above and below pixel B respectively;

LD4, which is a packet for transmitting a second line difference signal derived in a manner similar to that of LD2; and a DSS packet for transmitting digital sync, clamp period and "CD" quality digital audio.

The HDMAC-60 signal provides 131.25 "super lines" for each TV field. Of those "super lines", approximately 120 are active lines. Four luminance packets are provided for each "super line" thereby creating the capability for the transmission of high definition television (either a 525 line; 1:1 progressive or a 1050 line; 2:1 interlaced) substantially free of motion artifacts. The baseband video signal processing techniques taught in the '557 application creates a luminance and chrominance frequency response footprint resembling a "stair step" with all components close to the vertical and horizontal spatial axes updated for example at 59.95 Hz. The details of the HDMAC-60 signal, its derivation and the equipment needed to encode, decode and process are described in the '557 application, which is specifically incorporated by reference herein.

The present application is a continuation-in-part of U.S. patent application Ser. No. 254,954, filed Oct. 3, 1988, incorporated by reference herein. The '954 application describes a method and apparatus for converting the HDMAC-60 signal into an amplitude modulated RF signal. The present invention builds upon the teachings of the '954 application to provide for the creation and transmission of an HDTV multi-carrier signal on a channel having a conventional bandwidth.

The invention is particularly suitable for terrestrial and cable AM broadcast environments. Because direct compatibility with conventional receivers is not necessary, carriers may be suppressed and standard sync headroom may be eliminated. In addition, due to the use of heavy expansion of the signal components derived during the encoding process, performance similar to the signal-to-noise ratio of a conventional broadcast signal can be obtained with a significant reduction in carrier level. This will enable the system to utilize the "taboo" channels effectively without possible interchannel interference.

The method of the invention comprises the steps of modulating two signal components and expanding them in time so that both signals occupy, after expansion, the same bandwidth taken up by only one of them before expansion. If modulated in quadrature with each other, Double Side Band or Vestigial Side Band AM signals can be used with the efficiency of Single Side Band AM modulation. The only way to transmit the same amount of video information in the same frequency space without expansion and quadrature modulation is to transmit the signal components in time multiplex (one line after another) and modulated as a Single Side Band signal. This would be quite unpractical however because of the cost and performance of Single Side Band RF filters. The expansion of video components has the additional benefit of suppressing the ghosts added to any terrestrial video transmission.

The nature of the inventive system allows for a future increase in permissible channel bandwidth and the associated improvement in system performance, simply by widening the system and channel filters. No change in system packaging would be required. In addition, the exact bandwidths of the listed components may be altered by selecting different carrier frequencies to be described, allowing flexibility in system performance.

BRIEF DESCRIPTION OF THE DRAWINGS

FIG. 1 describes transmission format of the HDS/NA-6 signal;

FIGS. 4 and 5 describe the structure of a super block.

DETAILED DESCRIPTION OF A PREFERRED EMBODIMENT

Figures 1, 5:
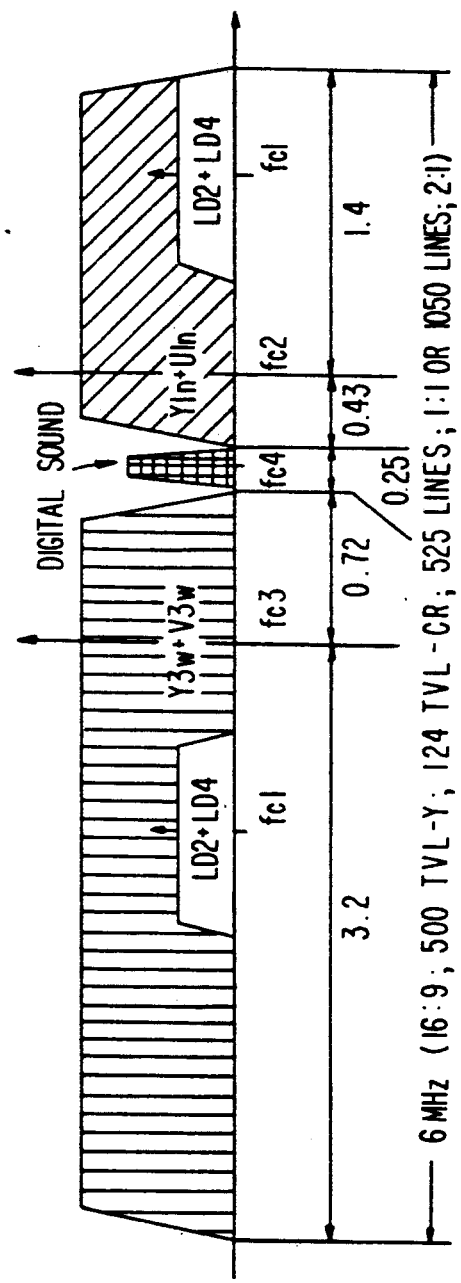

FIG. 1 describes the packaging of the HDS/NA-6 signal. In accordance with the invention these components are derived from a HDTV source input having a line sequence of lines 1, 2, 3, 4 and includes, for example:

Y1$n$—a narrow bandwidth luminance line which comprises for example, up to 215 TVL/ph (7.3 MHz), similar in nature to the HDMAC-60 Y1 line;

Y3$w$—a wideband luminance line which comprises for example, up to 495 TVL/ph (16.8 MHz), similar in nature to the HDMAC-60 Y3 line;

LD2, LD4—line difference signals which comprise for example, up to 88 TVL/ph (3 MHz), similar in nature to the HDMAC-60 LD lines;

U1$n$—a 4:1 vertically-decimated narrow bandwidth chrominance (color-difference) line comprising for example, 62 TVL/ph, similar in nature to the HDMAC-60 U1 line; V3$w$—a 4:1 vertically-decimated wideband chrominance (color-difference) line comprising for example, 109 TVL/ph, similar in nature to the HDMAC-60 V3 line; and DSS—digital synchronization, clamp and digital stereo sound, nominally 0.22 MHz wide continuously.

Note that chrominance is vertically decimated 4:1, but as described in the '557 application, the decimated may be controlled as to provide alternating wideband V and U for example, from field-to-field.

All video components are expanded by the factor 27/5. The line difference signals, LD2 and LD4, are modulated in quadrature and interleaved with both luminance lines Y1$n$ and Y3$w$, much the way chrominance is frequency interleaved in NTSC but with a much smaller interleaving penalty due to the low-energy nature of LD and its spectral composition as vertical detail. Interleaving quadrature modulated LD in both luminance lines creates a redundancy for better recovery, however, LD need only be combined with one of the luminance lines. Also, LD2 and LD4 do not have to be quadrature modulated with each other, for example LD2 may be interleaved with Y1$n$ and LD4 interleaved with Y3$w$.

Because the luminance lines are vertically decimated, frequency interleaving is accomplished by selecting a carrier frequency that is an odd multiple of half the decimated line rate. This suppressed carrier, fc1, is thus $(2n+1)fh/2$, where fh in this embodiment is half the input scan frequency rate. By changing the value of fc1, the listed bandwidths of LD2 and LD4 may be altered at the expense of more channel bandwidth or effectively lower interleaving frequencies. Lowering the interleaving frequency however may damage the low frequency spectra of all components. Note that it is also possible to select a different interleaving frequency for the Y3$w$ wideband component as compared to the Y1$n$ narrowband component, at the expense of receiver complexity and additional artifacts introduced to the relatively fragile vertically-decimated high frequency luminance information carried in the upper horizontal frequencies of Y3$w$.

The double sideband (DSB) narrowband chrominance signal U1$n$ is modulated in quadrature with the narrowband luminance signal Y1$n$ (which now has the imbedded, interleaved quadrature modulated LD components) which is filtered as a vestigial sideband signal (VSB) on suppressed carrier fc2. Similarly, components Y3$w$ and V3$w$ are quadrature modulated on suppressed carrier fc3, with Y3$w$ filtered as a VSB. Note that although both Y1$n$ and Y3$w$ vestiges face each other in this embodiment, they do not have to. However, this orientation allows the outer edges of the spectrum to grow if more bandwidth is available, without altering the format, carriers, or receiver VSB Nyquist slope filter.

Digital sync and sound supported by the system is frequency multiplexed into for example 0.25 MHz. Dolby Adaptive Delta Modulation (ADM) reduces a stereo pair to 440 kilobits per second. Using QPSK, this can be encoded into for example, about 0.22 MHz. More aggressive coding and RF techniques could greatly increase the data capacity of the 0.25 MHz frequency slot.

The expansion factor of 27/5 for all video components allows for a satisfactory time and frequency budget. The time budget is structured so that all but 46 microseconds in the vertical interval are completely occupied with video information in any given field. The 4-line video information "superblocks" total 118 for a field, thus forcing each block to occupy about 141 microseconds (as opposed to the previous 127.11 microsecond "superline" described in the '557 application). Each "superblock" consists of about 140.4 microseconds of active video information, and about 0.6 microseconds for clamp and other required timing information. The structure of each "superblock" is summarized in FIGS. 4 and 5.

Figure 2:
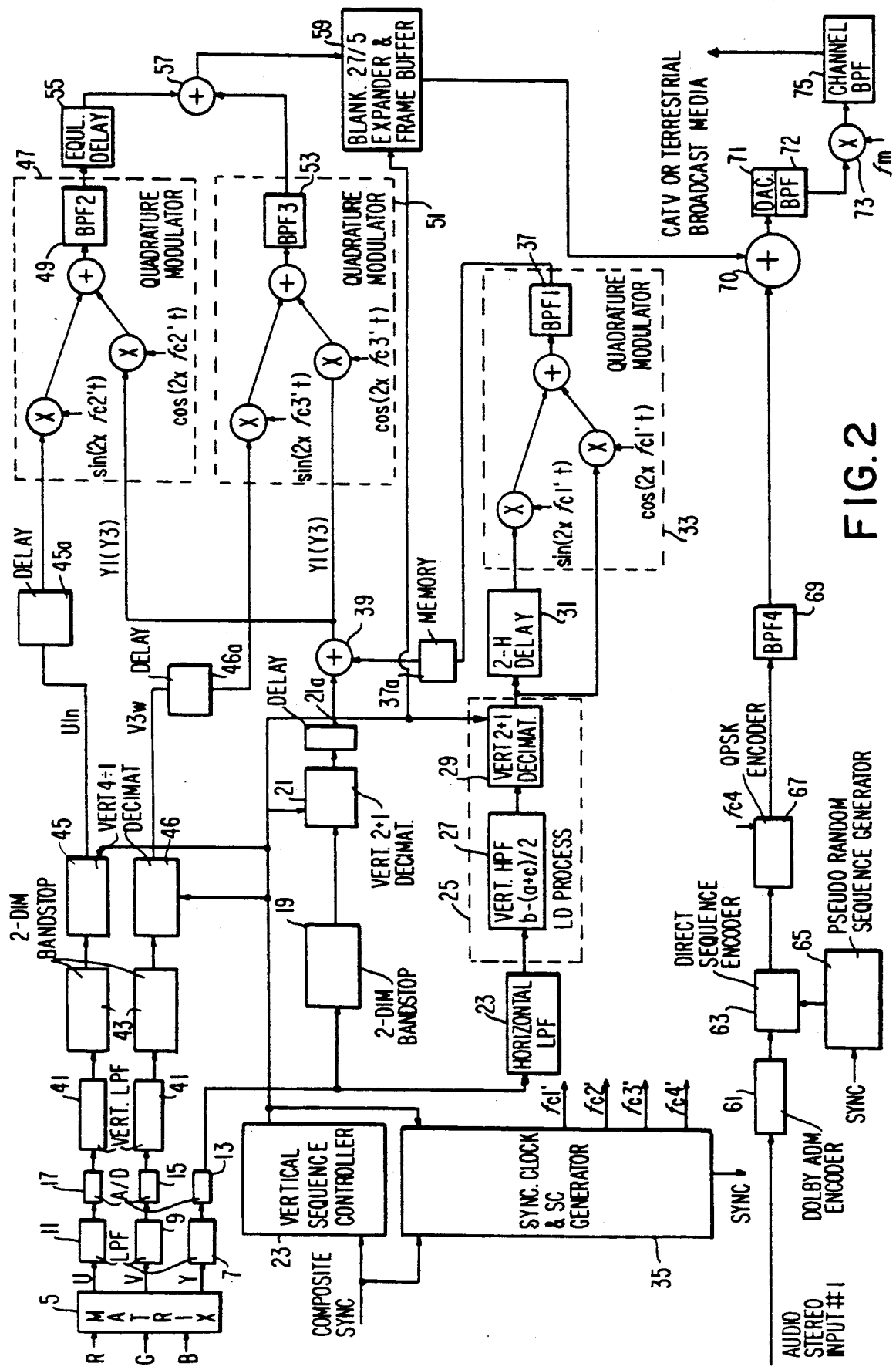
FIG. 2 describes a preferred embodiment of an encoder in accordance with the invention.

FIG. 2 describes an embodiment of an encoder for generating an HDTV signal in accordance with the invention.

Matrix 5 converts an HDTV RGB source signal to a luminance (Y) component and two chrominance components (V and U). Analog lowpass filters 7, 9 and 11 are anti-aliasing filters which limit Y to nominally about 16.8 MHz, V to nominally about 3.7 MHz, and U to nominally about 2.1 MHz respectively before analog to digital conversion (ADC) of the components by A/D converters 13, 15 and 17 respectively.

Luminance

The luminance component (Y) at the output of A/D 13 is fed into two paths simultaneously. In a first path, a two-dimensional bandstop filter 19 filters Y to suppress strong diagonal spatial information present in the source signal. Y is then vertically decimated 2:1 in decimator 21 forming in this example Y1 and Y3 (luminance components for lines 1 and 3). All system control signals (e.g. for controlling decimators 21, 29, 45 and 46) are generated by a vertical sequence controller 23, which can be a timing window generator locked to input composite sync from the source. With a 525/1:1 input, the 2:1 decimation is performed interlace style as described in the '557 application.

The second luminance path at the output of A/D 13 provides for the generation and processing of line difference components which are in this example, LD2 and LD4. Horizontal lowpass filter 23 limits Y to nominally 3 MHz in preparation for the LD generation block 25. LD is generated by vertically highpass filtering Y using a vertical filter 27 with an impulse response of, for example, $-\frac{1}{4} : \frac{1}{2} : -\frac{1}{4}$. The signal is vertically decimated 2:1 in decimator 29 as controlled by the vertical sequence controller 23 to be out of phase with the main luminance path vertical decimator 21.

After first delaying LD2 by two source lines in delay 31, so that LD2 will be coincident in time with LD4 at the quadrature modulator input, LD2 and LD4 are modulated in quadrature modulator 33, which multiplies LD2 by the sine of the modulating frequency and LD4 by the cosine of the modulating frequency. The modulating frequency, fc1', could be an odd multiple of half the source line rate. All carrier frequencies and sync signals are generated by the sync, clock, and subcarrier generator 35, which is locked to the input composite sync and controlled by the vertical sequence controller 23.

The quadrature modulated LD2 and LD4 signals are then bandpass filtered in bandpass filter 37 to remove one of the modulated images, a known requirement of heterodyning, and then are combined with the luminance components Y1 and Y3 in adder 39. It is assumed that the quadrature modulated LD components and the Y components are properly time-aligned to allow for optimum time utilization and to maximize the correlation effects. The Y and the quadrature modulated LD components are frequency interleaved in much the same manner as chrominance is frequency interleaved with luminance in NTSC.

Chrominance

After conversion to digital in A/D converters 15 and 17 the chrominance components, V and U pass through vertical lowpass filters 41 which limit their vertical spatial frequencies. Two dimensional bandstop filters 43 are used to suppress strong diagonal information that may cause excessive aliasing in the decoded picture. The 4:1 vertical decimator 45 selects one of four narrowband chrominance (U) lines to be encoded as a narrowband line for example U1n and similarly decimator 46 selects one of four wideband chrominance (V) lines to be encoded as a wideband line for example V3w. The vertical sequence controller 23 determines the nature of the decimation, much the same way as described in the '557 application.

The narrowband chrominance component U1n, and the luminance line component Y which has quadrature modulated LD2 and LD4 interleaved in its spectrum, are then combined in quadrature modulator 47 onto carrier fc2'. It is assumed that U1n and Y are vertically and horizontally aligned in time before the quadrature modulation process so as to allow for efficient time utilization and allow for modulation of correlated terms. As shown in FIG. 2 this can be accomplished by using delays 45a and 21a. The quadrature modulated components Y:U1n are then bandpass filtered in filter 49 to remove one modulation product which also creates a vestigial luminance component. Bandpass filter 49 also determines the bandwidth of the luminance component Y which at this point can be Y1 or Y3.

In an analogous manner, the wideband chrominance component V3w, and the luminance line component Y which also has LD2 and LD4 frequency interleaved, are then combined in quadrature modulator 51 onto carrier fc3'. Memory 37a is used to allow the LD2 and LD4 signals to be combined with both Y1 and Y3 components. It is assumed that V3w and Y are vertically and horizontally aligned as mentioned above as shown, for example in FIG. 2 by using delays 46a and 21a. The quadrature components are also bandpass filtered in filter 53 to remove one modulation product which also creates a vestigial luminance component. Bandpass filter 53 also determines the bandwidth of the luminance component Y which at this point can be either Y1 or Y3.

The U1n:Yn quadrature modulated components are then delayed 55 to be coincident in time with the V3w:Yw quadrature modulated components. The U1n:Yn components modulated on fc2 are then added 57 to the V3:Y3w components modulated on fc3, thus constituting a frequency multiplex of terms. These combined components are then windowed, time expanded by 27/5, and frame buffered in processing block 59 which is controlled by vertical sequence controller 23. Expansion in time reduces the frequency components, essentially lowering all carrier frequencies by the factor 5/27. Thus, fc2=(5/27) fc2", and fc3=(5/27)fc3". Windowing is required to select the appropriate point in time when the desired frequency multiplex package is properly assembled. Although in this example, both Y1 and Y3 are quadrature modulated with both chrominance components (U1n and V3w), forming U1n: Y1n, U1n: Y3n, V3w: Y1w and V3w: Y3w, the bandwidth limitation of a conventional T.V. channel, e.g. 6 mHz, requires that processor 59 provide the necessary windowing to select the desired components, e.g. U1n: Y1n and V3w: Y3w, coincident in time, and frequency multiplexed. Processor 59 also provides frame buffering which is required due to the 4-input line output block packaging which exceeds the 4-source line input period, but does not exceed the total budget of a given field.

Audio and Sync

An audio stereo pair are input to a Dolby adaptive delta modulation encoder 61. Sync is used as a reference for a pseudo-random sequence generator 65 which is used in conjunction with the direct sequence encoder 63. The resulting DSS package is quadrature phase shift key (QPSK) encoded 67 onto carrier fc4 and then bandpass filtered 69.

The modulated video and audio components are then frequency multiplexed by combining them in adder 70 in the frequency domain. Delay buffering is implied to compensate for video/audio skew occurring in the video/audio paths. The video/DSS frequency multiplexed package may then be converted to analog by the digital to analog converter 71, bandpass filtered 72 to remove repeat spectra, and then heterodyned 73 onto channel fm which is conventional television broadcast, cable or recording channel having, for example, a bandwidth of 6 mHz. The channel bandpass filter 75 removes one modulating product thereby determining the upper bandwidth bounds for luminance components Y.

Figure 3:
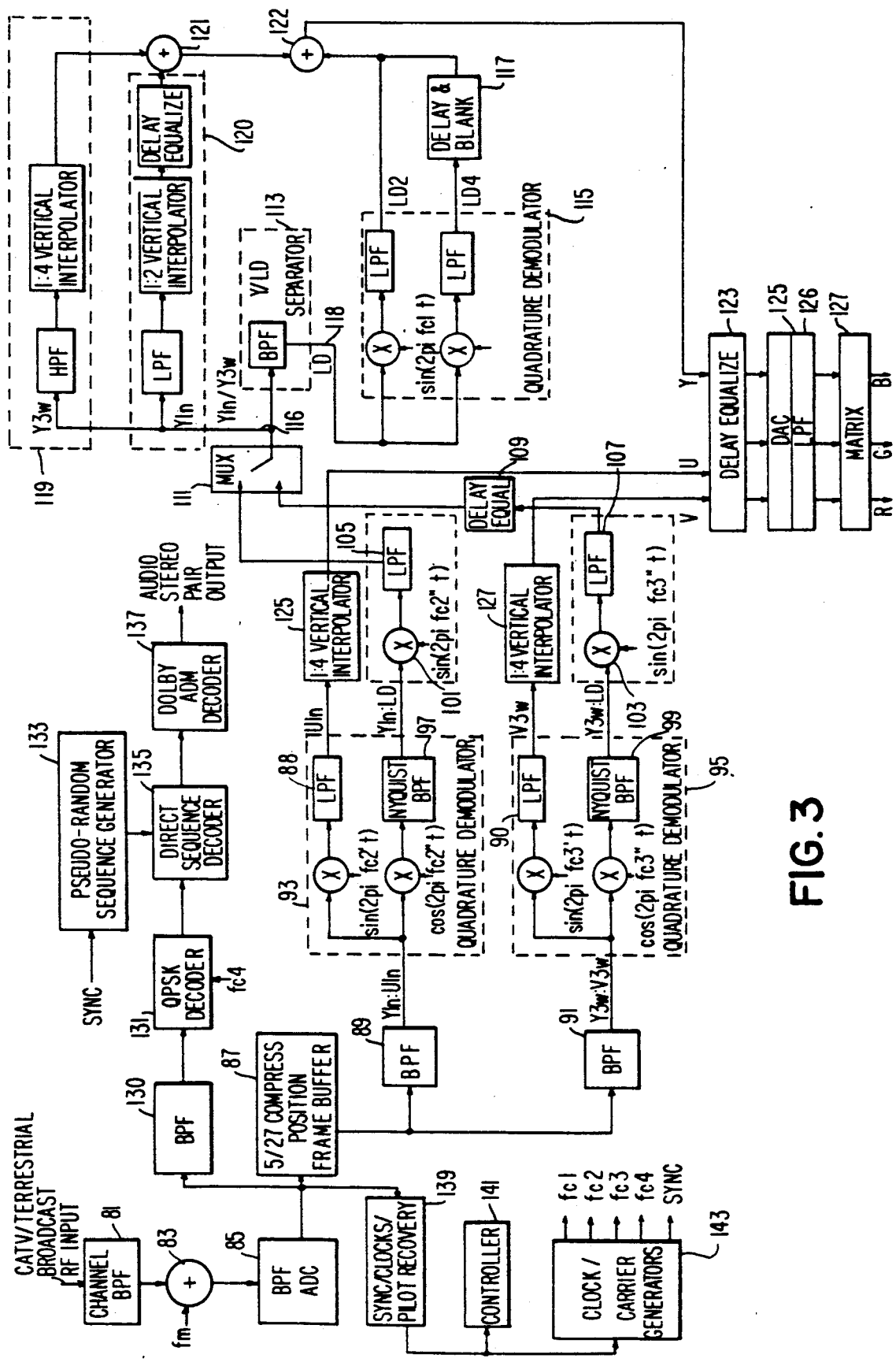
FIG. 3 describes a preferred embodiment of a decoder in accordance with the invention.

FIG. 3 describes one embodiment of a decoder comprising the invention. The function of such a decoder is to extract the frequency multiplexed video and audio components from the signal HDS/NA-6 and provide an HDTV display. This is accomplished by quadrature demodulating video components Y1n: U1n, Y3w: V3w, and QPSK demodulating the DSS.

After channel filtering in bandpass filter 81 and demodulation to an intermediate frequency in adder 83, the HDS/NA-6 signal is converted to digital in A/D converter 85. The video components are then fed into a block memory buffer 87 to adjust for the line-time overflow compensation provided by the encoder. The buffer 87 also serves as a 5/27 time compressor which is capable of positioning and delay equalizing the components for further processing. Note that the compressors could also be located at the rear-end of the decoder for reduced clock speed requirements in the signal processing blocks.

The frequency-multiplexed video is broken up into Y1n: U1n and Y3w: V3w paths by bandpass filters 89 and 91 respectively which 'window out' in frequency the appropriate components. Each video path comprises a quadrature demodulator (93 and 95) which quadrature demodulates respective chrominance components to baseband, and respective luminance components (with imbedded frequency interleaved quadrature modulated LDs) to an intermediate frequency. The baseband chrominance terms are lowpass filtered in filter 88 and 90 to remove the higher-ord demodulation products. The luminance components are Nyquist slope filtered in filters 97 and 99, heterodyned to baseband in mixer 101, and then lowpass filtered to remove higher-order modulation products in filter 105.

The memory circuits in buffer 87 allow for correct positioning of the luminance/LD components so that they can be combined on one bus in a time multiplexed format. The Y1n: LD path and Y3w: LD path can then be positioned properly in the time domain for downstream display utilizing the delay equalizer 109, allowing the components to be multiplexed 111 onto one bus. The luminance/LD components output from multiplexer 111 pass to a Y/LD separator 113 which uses a bandpass filter to 'window out' in frequency the LD components. In this embodiment, with LD2 and LD4 modulated in quadrature and interleaved with both Y1n and Y3w, the luminance path 116 can be fed directly from multiplexer 111 without LD separation because the interleaved LD alternates from line to line and thus integrates out over the picture, in much the same way that NTSC color is manifested on black and white receivers.

The separated LD components are then input to a quadrature demodulator 115 which quadrature demodulates the LD2: LD4 components to baseband. LD4 is delayed in delay 117 for correct reconstruction positioning, and LD2 and LD4 are then combined onto one bus in time multiplexed fashion.

The luminance separated in branch 116 is comprised of Y1n: 0: Y3w: 0. The Y3w signal is one of four source lines, and its high frequencies must be up-interpolated. This is performed in block 119, as described in the '557 application. The high frequencies are those above Y1n cutoff. Note that the frequencies from DC to Y1n cutoff are present in one of every two source lines, and these are up-interpolated ('line-doubled') in block 120 as described in the '557 application. Y1n and Y3w are then combined in adder 121 and further combined with the LD components in adder 122 to reconstitute the characteristic "stairstep" frequency response described in the '557 application.

The chrominance signals (U1n and V3w) are present in one out of every four source lines, and must be up-interpolated 1: 4 in interpolators 125 and 127 respectively, as described for U and V components in the '557 application. The luminance (Y) and chrominance (U and V) components are then passed through delay equalizer 123, converted to analog in D/A converter 125, lowpass filtered in filter 126, and then matrixed in matrix 127 to RGB for HDTV display.

Digital audio is extracted by windowing out in frequency the DSS components with bandpass filter 130, and then feeding the DSS signal to a QPSK demodulator 131. This signal can then be direct sequence decoded 135 under control of the pseudo-random sequence generator 133, and then Dolby ADM decoded 137.

All carrier frequencies are recovered, and the system timing and clocks are generated by control blocks 139, 141 and 143.

Although the present invention has been described in a specific embodiment, it is not to be limited thereto. Many variations will occur to one skilled in the art and these are intended to be encompassed in the following claims.

We claim:

1. A method for forming a frequency multiplexed television signal, comprising the steps of:

(a) deriving from a first television signal, a pair of luminance signals, and a pair of chrominance signals;

(b) quadrature modulating a first luminance signal with a first chrominance signal on a first subcarrier forming a first frequency packet;

(c) quadrature modulating a second luminance signal with a second chrominance signal on a second subcarrier forming a second frequency packet;

(d) time expanding each of said frequency packets; and (e) combining said time expanded frequency packets to generate said frequency multiplexed television signal.

2. The method of claim 1 further comprising the steps of:

(a) deriving from said first television signal, a pair of line difference signals;

(b) combining at least one of said line difference signals with at least one of said luminance signals.

3. The method of claim 2 wherein said line difference signals are quadrature modulated with each other on a third subcarrier forming a third frequency packet which is then combined with one of said luminance components.

4. The method of claim 3 wherein said third frequency packet is combined with both of said luminance components.

5. Apparatus for forming a frequency multiplexed television signal, comprising:

a) means for deriving from a first television signal a pair of luminance signals and a pair of chrominance signals;

b) first modulating means coupled to said deriving means, for quadrature modulating a first luminance signal with a first chrominance signal on a first subcarrier so as to form a first frequency packet;

c) second modulating means coupled to said deriving means, for quadrature modulating a second luminance signal with a second chrominance signal on a second subcarrier so as to form a second frequency packet;

d) means coupled to said first and second modulating means, for expanding each of said frequency packets; and e) means coupled to expanding means, for combining said expanded frequency packets to generate said frequency multiplexed television signal.

6. The apparatus of claim 5, further comprising:

a) second deriving means for deriving from said first television signal, a pair of line difference signals;

b) means coupled to said second deriving means, for combining one of said line difference signals with at least one of said luminance signals.

7. The apparatus of claim 6, further comprising means coupled to said second deriving means, for quadrature modulating said line difference signals with each other on a third subcarrier so as to form a third frequency packet.

8. Apparatus for providing a television display from the frequency multiplexed signal of claim 5, comprising in combination:

a) means for deriving from said frequency multiplexed signal said first and second frequency packets;

b) means for deriving from said first frequency packet, said first luminance signal and said first chrominance signal;

c) means for deriving from said second frequency packet, said second luminance signal and said second chrominance signal; and d) means for combining said first and second luminance components and said first and second chrominance components to form said television display.

* * * * *